(12) United States Patent
Barbour

(10) Patent No.: US 9,284,043 B2
(45) Date of Patent: Mar. 15, 2016

(54) EVALUATING AILERON DEFLECTION WHILE AN UNMANNED AERIAL VEHICLE IS IN FLIGHT

(71) Applicant: AAI Corporation, Hunt Valley, MD (US)

(72) Inventor: James M. Barbour, Kingsville, MD (US)

(73) Assignee: AAI Corporation, Hunt Valley, MD (US)

(*) Notice: Subject to any disclaimer, the term of this patent is extended or adjusted under 35 U.S.C. 154(b) by 76 days.

(21) Appl. No.: 14/086,370

(22) Filed: Nov. 21, 2013

(65) Prior Publication Data

US 2015/0142223 A1    May 21, 2015

(51) Int. Cl.
    B64C 13/16    (2006.01)
    B64D 45/00    (2006.01)
    G05D 1/00     (2006.01)

(52) U.S. Cl.
    CPC .............. B64C 13/16 (2013.01); G05D 1/0055 (2013.01); *B64C 2201/141* (2013.01)

(58) Field of Classification Search
    CPC .... B64C 2009/005; B64C 9/00; B64C 13/00; B64C 2201/141; B64C 13/16; B64D 2045/0085; G01C 23/00; G01C 23/005; G01M 9/06; G01M 9/08; G05D 1/0077; G05D 1/0055; G08G 5/0013; G08G 5/0021
    USPC .......... 701/3, 4, 14; 702/85, 94, 95, 107, 163; 340/945, 963, 964; 244/1, 75.1, 158
    See application file for complete search history.

(56) References Cited

U.S. PATENT DOCUMENTS

| 3,857,535 | A  | * | 12/1974 | Osder ........................ 244/195 |
| 4,016,798 | A  | * | 4/1977  | Inouye ....................... 89/37.16 |
| 4,110,605 | A  | * | 8/1978  | Miller ................... G01M 1/127 701/124 |
| 4,312,042 | A  | * | 1/1982  | Bateman ................ G01G 19/07 177/136 |
| 4,441,675 | A  | * | 4/1984  | Boehringer et al. .......... 244/213 |
| 5,505,407 | A  | * | 4/1996  | Chiappetta .......... B64C 29/0025 244/12.5 |
| 6,554,229 | B1 | * | 4/2003  | Lam et al. ..................... 244/217 |
| 7,984,880 | B2 | * | 7/2011  | Gomes .......................... 244/230 |
| 8,011,620 | B2 |   | 9/2011  | Guptaa et al. |
| 8,220,749 | B2 |   | 7/2012  | Pastelak |
| 8,234,037 | B2 | * | 7/2012  | Goupil et al. ................ 701/33.9 |
| 8,336,816 | B2 |   | 12/2012 | Miller |
| 8,478,457 | B2 | * | 7/2013  | Bendisch et al. ................ 701/3 |
| 8,543,322 | B1 | * | 9/2013  | Nance ..................... B64C 25/00 701/120 |
| 8,566,054 | B1 | * | 10/2013 | Schweigert et al. ............ 702/87 |
| 8,755,956 | B2 | * | 6/2014  | Goupil et al. ................... 701/14 |
| 2004/0036601 | A1 | * | 2/2004 | Obradovich .................. 340/540 |
| 2004/0098140 | A1 | * | 5/2004 | Hess ................................ 700/3 |
| 2009/0048689 | A1 | * | 2/2009 | Pelton et al. .................... 700/33 |

(Continued)

*Primary Examiner* — Fadey Jabr
*Assistant Examiner* — Angelina Shudy
(74) *Attorney, Agent, or Firm* — BainwoodHuang

(57) ABSTRACT

A technique is directed to operating a UAV. The technique involves launching (or guiding) the UAV into flight. The technique further involves performing a series of aileron (or other control surface) deflection evaluations while the UAV is in flight. The technique further involves performing a UAV remedial operation in response to the series of aileron deflection evaluations indicating abnormal aileron behavior, e.g., the UAV can send a warning message to a ground control station (GCS), land the UAV at a target location, deploy a chute, and so on. Such operation enables detection of an unexpected change in the UAV's center of gravity, e.g., due to a blocked fuel bladder connection, icing on one side of the UAV, mechanical failure of an aileron, etc.

24 Claims, 5 Drawing Sheets

(56) References Cited

U.S. PATENT DOCUMENTS

| | | | |
|---|---|---|---|
| 2009/0112502 A1* | 4/2009 | Albelda et al. | 702/94 |
| 2009/0272851 A1* | 11/2009 | Delporte | B64C 17/10 244/135 C |
| 2010/0004803 A1* | 1/2010 | Manfredi et al. | 701/14 |
| 2012/0296500 A1* | 11/2012 | Yamasaki | 701/14 |
| 2013/0068893 A1* | 3/2013 | Thomas | 244/194 |
| 2014/0224927 A1* | 8/2014 | Freund | B64D 37/00 244/1 N |
| 2014/0288730 A1* | 9/2014 | Fucke et al. | 701/3 |
| 2015/0100227 A1* | 4/2015 | Nance | B64D 45/00 701/124 |

* cited by examiner

EVALUATING AILERON DEFLECTION WHILE AN UNMANNED AERIAL VEHICLE IS IN FLIGHT

BACKGROUND

A conventional fixed-wing unmanned aircraft (UA) includes a left fuel bladder disposed in a left wing of the fixed-wing UA and a right fuel bladder disposed in a right wing of the fixed-wing UA. The left and right fuel bladders connect to a T-shaped coupling which leads to a fuel delivery subsystem that draws fuel for the engine of the fixed-wing UA.

During flight, the fuel delivery subsystem supplies fuel which is consumed by the engine to propel the fixed-wing UA forward. As the fuel bladders empty, the fixed-wing UA becomes lighter.

SUMMARY

Unfortunately, there are deficiencies to the above-described conventional fixed-wing UA. In particular, it is possible for one of the fuel bladder connections to become blocked (e.g., clogged or pinched). As a result, only one fuel bladder supplies fuel to the engine. Over time, the unblocked side of the fixed-wing UA becomes lighter relative to the blocked side of the fixed-wing UA. To compensate for this imbalance, the control system of the fixed-wing UA moves one aileron progressively up and the other aileron progressively down. Since aileron data from fixed-wing UAs is typically not communicated to ground control stations (GCSs), there may be no indication that a fixed-wing UA with a blocked fuel bladder connection is in distress.

Ultimately, the fixed-wing UA may succumb to catastrophic failure. For example, as fuel is progressively drawn from only one wing, the fixed-wing UA may enter an uncontrolled roll due to an extreme shift in the center of gravity of the fixed-wing UA. As another example, although the fixed-wing UA may still have fuel in the blocked fuel bladder, the engine will stop once all of the fuel is drawn from the unblocked fuel bladder.

In contrast to the above-described conventional fixed-wing UA which is susceptible to catastrophic failure when a fuel bladder connection becomes blocked, improved techniques are directed to evaluating aileron deflection while an unmanned aerial vehicle (UAV) is in flight. Such operation enables detection of unexpected or abnormal aileron behavior. Along these lines, a flight control circuit of the UAV can monitor aileron metrics such as average aileron position to determine whether one aileron begins to progressively move up while the other aileron begins to progressively move down over time. For example, a blocked fuel bladder connection can result in fuel consumed from only one side or wing of the UAV while the other side or wing remains relatively full. Accordingly, the ailerons deflect differently to adjust to shifting of the UAV's center of gravity over time. Eventually, if change in the UAV's center of gravity becomes too severe (e.g., detected by exceeding a predefined threshold), the flight control circuit can perform a remedial operation such as send a warning message to a ground control station (GCS), land at a target location, deploy a chute, and so on. Moreover, such operation not only protects the UAV against failure of a fuel bladder connection, such operation can safeguard against other events such as a mechanical aileron failure, icing on one side or on one wing of the UAV, and so on.

One embodiment is directed to a method of operating a UAV. The method includes launching (or guiding) the UAV into flight. The method further includes performing a series of control surface deflection evaluations while the UAV is in flight. The method further includes performing a UAV remedial operation in response to the series of control surface deflection evaluations indicating abnormal control surface deflection behavior.

In some arrangements, performing the series of control surface deflection evaluations includes identifying a set of initial aileron positions, and comparing a set of average aileron positions to the set of initial aileron positions. In these arrangements, performing the series of control surface deflection evaluations further includes providing a series of evaluation results indicating whether the UAV has encountered abnormal aileron deflection behavior.

In some arrangements, identifying the set of initial aileron positions includes (i) identifying, as one of the initial aileron positions, a first neutral position for a first aileron of the UAV, and (ii) identifying, as another of the initial aileron positions, a second neutral position for a second aileron of the UAV.

In some arrangements, comparing the set of average aileron positions to the set of initial aileron positions includes maintaining a first aileron position average for the first aileron, the first aileron position average representing an average amount of angular deflection of the first aileron from the first neutral position. In these arrangements, comparing the set of average aileron positions to the set of initial aileron positions further includes maintaining a second aileron position average for the second aileron, the second aileron position average representing an average amount of angular deflection of the second aileron from the second neutral position.

In some arrangements, providing the series of evaluation results includes outputting normal evaluation results indicating normal aileron deflection behavior when each aileron position average remains below a predefined aileron position average threshold. In these arrangements, providing the series of evaluation results further includes outputting abnormal evaluation results indicating abnormal aileron deflection behavior when at least one aileron position average exceeds the predefined aileron position average threshold.

In some arrangements, providing the series of evaluation results includes outputting normal evaluation results indicating normal aileron deflection behavior when a sum of the aileron position averages remains below a predefined aileron position average threshold. In these arrangements, providing the series of evaluation results further includes outputting abnormal evaluation results indicating abnormal aileron deflection behavior when the sum of the aileron position averages exceeds the predefined aileron position average threshold.

In some arrangements, launching the UAV into flight includes flying the UAV in a straight-line level pattern during an auto-launch time period following takeoff.

In some arrangements, identifying the set of initial aileron positions includes recording, as a first neutral position for the first aileron, a current position of the first aileron while the UAV flies in the straight-line level pattern during the auto-launch time period. In these arrangements, identifying the set of initial aileron positions further includes recording, as a second neutral position for the second aileron, a current position of the second aileron while the UAV flies in the straight-line level pattern during the auto-launch time period.

In some arrangements, performing the UAV remedial operation includes sending a warning message to a ground control station indicating that the UAV has encountered a weight imbalance condition.

In some arrangements, performing the UAV remedial operation includes performing a fuel assessment operation which provides a result indicating whether a single operable fuel bladder of the UAV has enough fuel for the UAV to land at the designated target location.

In some arrangements, performing the UAV remedial operation further includes flying the UAV to the designated target location and landing the UAV at the designated target location when the result of the fuel assessment operation indicates that the single operable fuel bladder of the UAV has enough fuel for the UAV to land at the designated target location. In these arrangements, performing the UAV remedial operation further includes deploying a chute of the UAV when the result of the fuel assessment operation indicates that the single operable fuel bladder of the UAV does not have enough fuel for the UAV to land at the designated target location.

In some arrangements, performing the UAV remedial operation includes performing a fuel assessment operation which provides a result indicating whether a single operable fuel bladder of the UAV has enough fuel for the UAV to complete an initially assigned mission.

In some arrangements, performing the UAV remedial operation further includes completing the initially assigned mission when the result of the fuel assessment operation indicates that the single operable fuel bladder of the UAV has enough fuel for the UAV to complete the initially assigned mission. In these arrangements, performing the UAV remedial operation further includes aborting the initially assigned mission when the result of the fuel assessment operation indicates that the single operable fuel bladder of the UAV does not have enough fuel for the UAV to complete the initially assigned mission.

In some arrangements, performing the series of control surface deflection evaluations includes providing compensation input to the series of control surface deflection evaluations in response to release of ammunition from the UAV.

Another embodiment is directed to a UAV which includes a UAV frame, ailerons supported by the UAV frame, and a controller supported by the UAV frame and in operable communication with the ailerons. The controller is constructed and arranged to (i) perform a series of aileron deflection evaluations while the UAV is in flight, and (ii) perform a UAV remedial operation in response to the series of aileron deflection evaluations indicating abnormal aileron behavior.

Yet another embodiment is directed to a computer program product having a non-transitory computer readable medium which stores a set of instructions to operate a UAV. The set of instructions, when carried out by computerized circuitry, cause the computerized circuitry to perform a method of launching the UAV into flight, performing a series of aileron deflection evaluations while the UAV is in flight, and performing a UAV remedial operation in response to the series of aileron deflection evaluations indicating abnormal aileron behavior.

Other embodiments are directed to vehicle-related systems, subsystems and apparatus, processing circuits, other computer program products (e.g., computer program products for ground control stations), and so on. Some embodiments are directed to various methods, apparatus, components and circuitry which are involved in operating unmanned vehicles with control surfaces.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to evaluating aileron deflection while an unmanned aerial vehicle (UAV) is in flight. Such operation enables detection of abnormal control surface behavior. In particular, a flight control circuit of the UAV can monitor aileron metrics such as average aileron position to determine whether one aileron begins to progressively move up while the other aileron begins to progressively move down over time. For example, a blocked fuel bladder connection can cause fuel to be consumed from only one side or wing of the UAV while the other side or wing remains relatively full. As a result, the ailerons deflect differently to adjust to shifting of the UAV's center of gravity during the course of flight. Eventually, if the change in the UAV's center of gravity becomes too severe (e.g., detected by exceeding a predefined threshold), the flight control circuit can perform a remedial operation such as send a warning message to a ground control station (GCS), land at a target location, deploy a chute, and so on. Furthermore, such operation not only protects the UAV against failure of a fuel bladder connection, such operation operates as a safeguard against other situations such as mechanical aileron failure, icing on one side or on one wing of the UAV, and so on.

Figure 1:
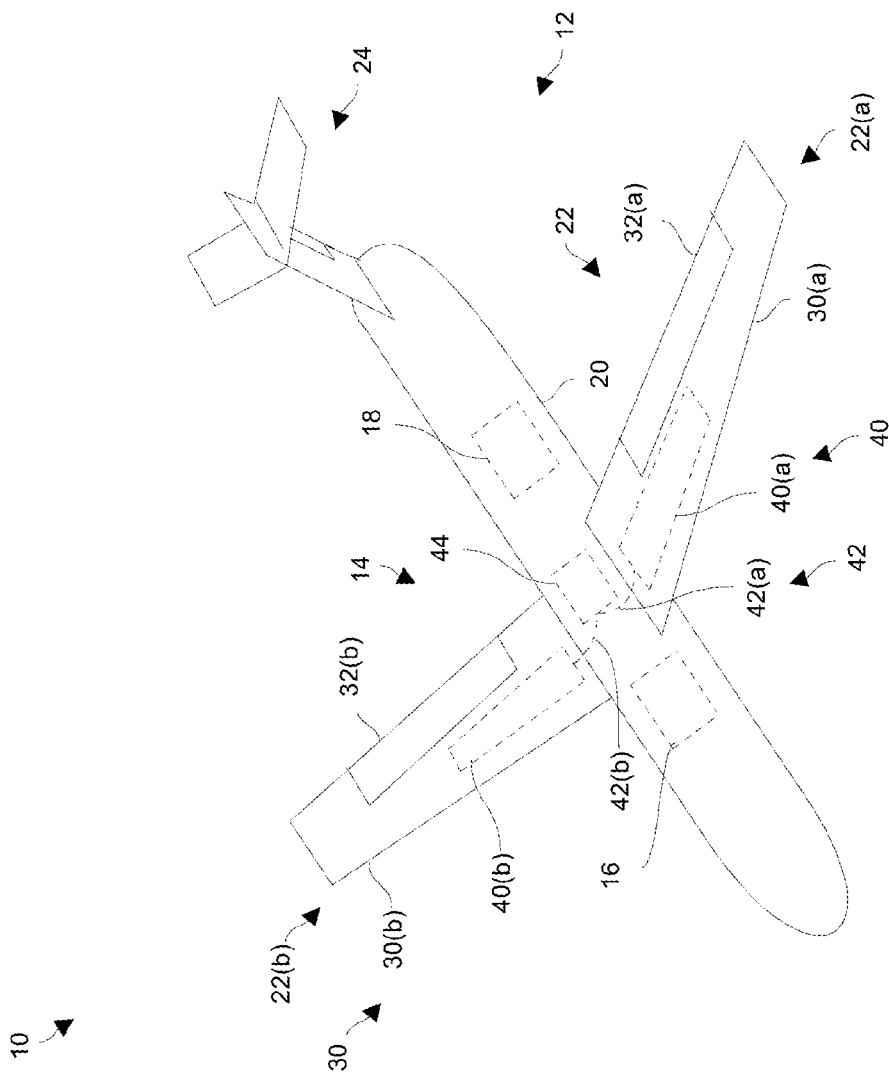
FIG. 1 is a perspective view of an unmanned aerial vehicle (UAV) which is equipped to evaluate aileron deflection while in flight.
Figure 2:
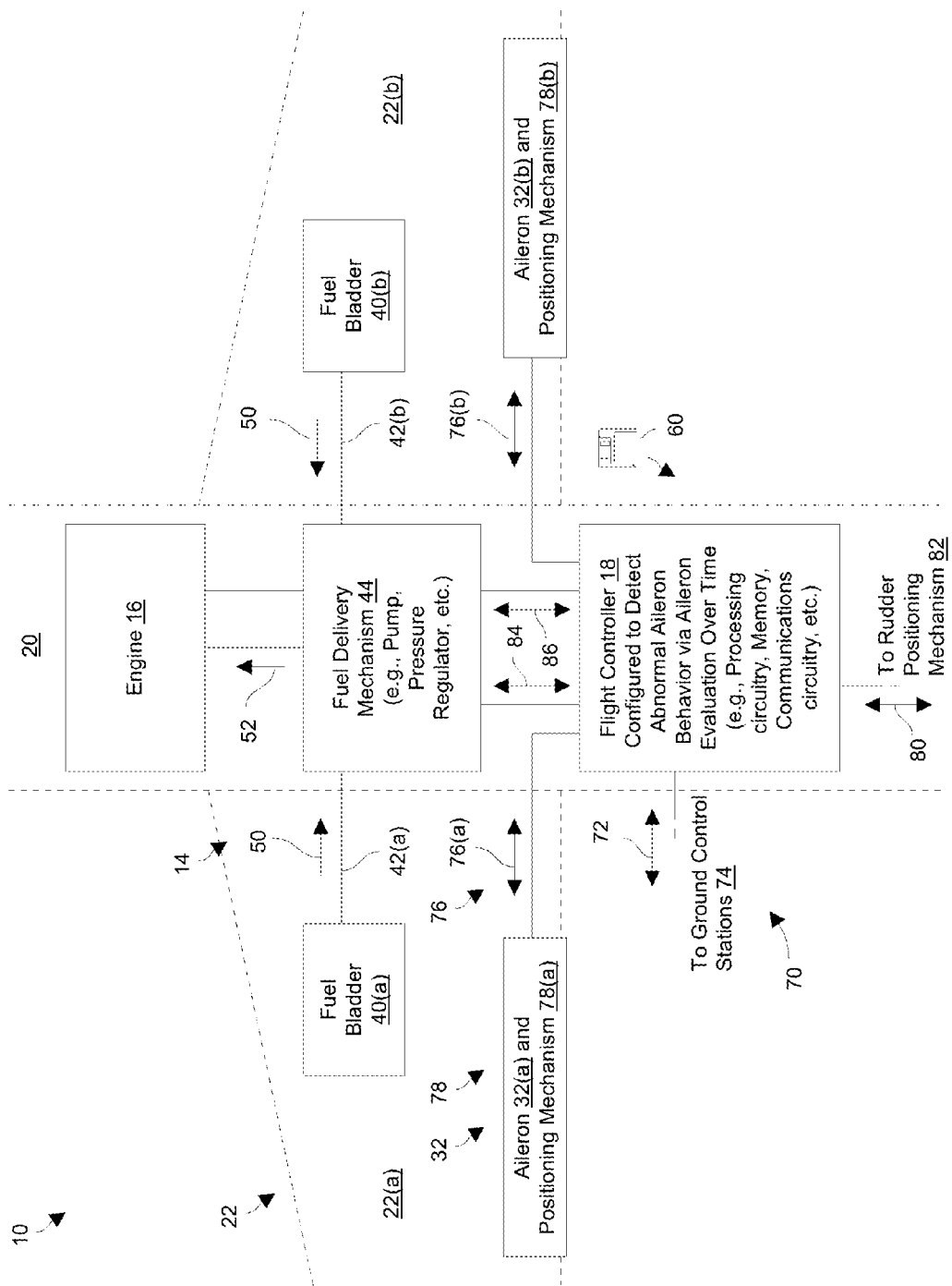
FIG. 2 is a block diagram of particular components of the UAV of FIG. 2.

FIGS. 1 and 2 illustrate certain details of a UAV 10 which is equipped to evaluate aileron deflection while in flight. FIG. 1 shows a perspective view of the UAV 10. FIG. 2 shows a block diagram of particular components of the UAV 10. As shown in FIGS. 1 and 2, the UAV 10 includes, among other things, a frame (or body) 12, a fuel subsystem 14, an engine 16, and a flight controller 18.

The frame 12 includes a central support section 20, main wings 22(*a*), 22(*b*) (collectively, main wings or simply wings 22), and a tail section 24 (FIG. 1). The central support section 20 is constructed and arranged to support and protect particular components of the UAV such as the engine 16 and the flight controller 18. The wings 22 include fixed portions 30 and ailerons 32 (FIG. 1). In particular, the wing 22(*a*) includes a fixed portion 30(*a*) and an aileron 32(*a*) which is capable of moving relative to the fixed portion 30(*a*) (e.g., under actuator control). Similarly, the wing 22(*b*) includes a fixed portion 30(*b*) and an aileron 32(*b*) which is capable of moving relative to the fixed portion 30(*b*).

The fuel subsystem 14 includes multiple fuel bladders 40, fuel lines 42, and a fuel delivery mechanism 44. The fuel bladders 40 store fuel 50 (FIG. 1) which is drawn through the fuel lines 42 by the fuel delivery mechanism 44. One fuel bladder 40(*a*) is disposed within the fixed portion 30(*a*) of the wing 22(*a*) and couples to the fuel delivery mechanism 44 via a fuel line 42(*a*). Likewise, another fuel bladder 40(*b*) is disposed within the fixed portion 30(*b*) of the wing 22(*b*) and couples to the fuel delivery mechanism 44 via a fuel line 42(b). The fuel delivery mechanism 44 is disposed within the central support section 20 of the frame 12, and is constructed and arranged to combine both fuel sources and then deliver the fuel 50 to the engine 16 at a regulated pressure (see arrow 52 in FIG. 2).

The engine 16 is disposed within the central support section 20 of the frame 12. The engine 16, which is under control of the flight controller 18, receives and combusts the regulated fuel 52 to provide propulsion.

The flight controller 18 is disposed within the central support section 20 of the frame 12. The flight controller 18 includes processing circuitry (e.g., one or more microprocessors, processing modules, CPU cores, etc.), memory, communications circuitry, and so on. Together, such circuitry controls the operation of the UAV 10 (e.g., launching, execution of a flight plan, landing, etc.). To this end, the memory stores a variety of software constructs such as an operating system and a set of specialized applications.

A computer program product 60 (FIG. 2) is capable of delivering all or portions of these software constructs to the local memory of the flight controller 18. The computer program product 60 has a non-transitory (or non-volatile) computer readable medium which stores a set of instructions to control one or more operations of the UAV 10. Examples of suitable computer readable storage media include tangible articles of manufacture and apparatus which store instructions in a non-volatile manner such as CD-ROM, flash memory, disk memory, tape memory, and the like.

It should be understood that the flight controller 18 may further include other electronic components and circuitry such as actuators, sensors, GPS circuitry, surveillance devices, and so on. In some arrangements, such processing circuitry is implemented using processors, memory, application specific ICs (ASICs), field programmable gate arrays (FPGAs) and associated programs, discrete components, analog circuits, combinations thereof, and so on.

During operation, the flight controller 18 receives and provides a variety of electronic signals 70. In particular, the flight controller 18 exchanges communications signals 72 with a set of ground control stations 74 (GCSs), e.g., receives commands, provides status, etc. Additionally, the flight controller 18 exchanges aileron positioning signals 76 with aileron positioning mechanisms 78 (FIG. 2) to control positioning of the ailerons 32 and thus control lift of the UAV 10 during flight. Furthermore, the flight controller 18 exchanges rudder positioning signals 80 with a rudder positioning mechanism 82 (FIG. 2) to control direction of the UAV 10 during flight. Also, the flight controller 18 exchanges fuel delivery signals 84 with the fuel delivery mechanism 44, e.g., to control and monitor the fuel 52 provided to the engine 16, etc. Moreover, flight controller 18 exchanges engine signals 86 with the engine 16, e.g., to control and monitor engine operation, e.g., rotations per minute, temperature, etc.

It should be understood that the flight controller 18 may perform operations other than flight control. Along these lines, the flight controller 18 is capable of operating surveillance devices (e.g., cameras, radar, infrared scanners, etc.), munitions arming and deployment, communications relaying, and so on.

At this point, it should be understood that the flight controller 18 evaluates aileron positioning to determine whether changes have occurred in the center of gravity of the UAV 10. In particular, the flight controller 18 identifies an initial set of aileron positions shortly after takeoff while the UAV 10 is in straight-line level flight. The flight controller 18 considers this initial set of aileron positions as neutral positions in which the ailerons 32 have little or no angular deflection.

Next, in an ongoing manner, the flight controller 18 maintains a set of average aileron positions representing the average amounts of angular deflection from the initial set of aileron positions. Deflection of an aileron 32 is measured as the difference between the neutral position and the current position for that aileron 32. The flight controller 18 analyzes these aileron position averages to determine whether abnormal aileron behavior exists.

Equation (1) below is suitable for maintaining a running aileron position average:

$$CRA = \frac{PCRA*(NOR-1) + MRR}{NOR} \quad (1)$$

where
CRA=the current running aileron position average,
PCRA=the previously calculated running aileron position average,
NOR=the number of readings since the start of flight or during a time window,
MRR=the most recent reading of the aileron's position.
It should be understood that the processing and memory demands on the circuitry of the flight controller 18 are relatively small due to calculating the current running aileron position average from a previously calculate running aileron position average over time. In some arrangements, the flight controller 18 computes the CRA multiple times a second (e.g., five times a second, etc.).

In some arrangements, the value of NOR is derived from timestamps outputted by circuitry of the flight controller 18. In these arrangements, only the values of MRR, CRA, and PCRA for each aileron 32 are stored in local memory of the flight controller 18.

It should be understood that the positions of the ailerons 32 can be measured in a variety of different ways. For example, in some arrangements, aileron position is measured directly via sensors (e.g., actuator feedback, independent sensors, etc.). In other arrangements, aileron position is measured by sampling aileron positioning signals sent from the flight controller 18 to the aileron positioning mechanisms 78 to control angular deflection of the ailerons 32. Further details will now be provided with reference to FIG. 3.

Figure 3:
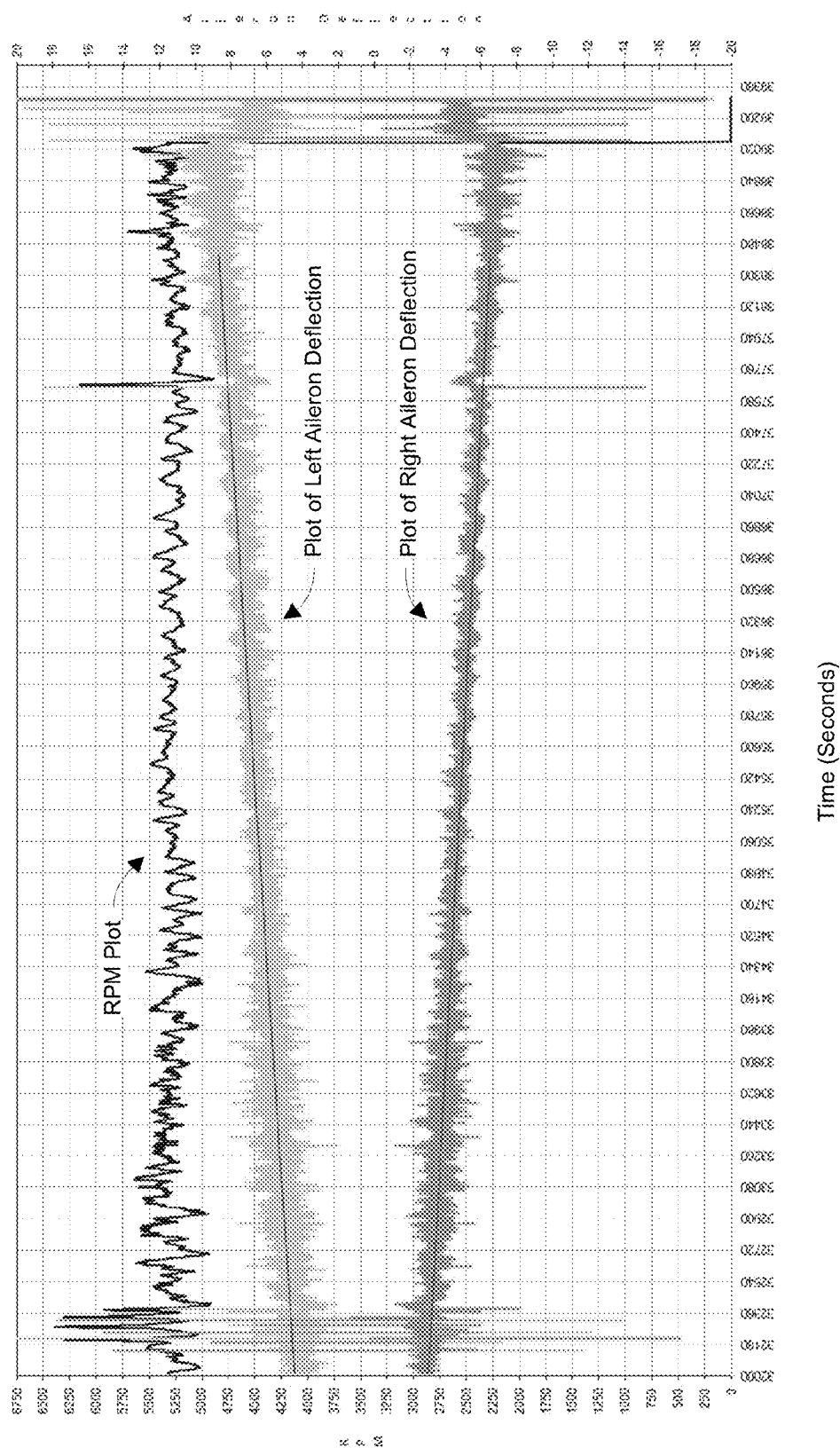
FIG. 3 is a graph of particular operating data which is accessible by the UAV of FIG. 1 during flight.

FIG. 3 shows data 100 that is obtained by the flight controller 18 during a particular flight in which the UAV 10 encounters abnormal aileron behavior. The data 100 includes a plot of engine rotations per minute (RPM) during the flight. Additionally, the data 100 includes a plot of left aileron deflection and a plot of right aileron deflection during the flight (e.g., also see the ailerons 32(a), 32(b) in FIGS. 1 and 2).

In connection with FIG. 3, suppose that the fuel line 42(a) becomes clogged or pinched while the other fuel line 42(b) remains fully operable (also see FIGS. 1 and 2). During such a situation, the fuel delivery mechanism 44 will no longer draw fuel 50 from the fuel bladder 40(a), but will continue to draw fuel 50 from the fuel bladder 40(b) at a higher than normal rate. Accordingly, the center of gravity of the UAV 10 will gradually shift from the general center of the UAV 10 to the wing 22(a), i.e., the wing 22(a) will become heavier than the wing 22(b) due to there being more fuel 50 in the fuel bladder 40(a) disposed in the wing 22(a).

As a result, the flight controller 18 will operate the ailerons 32 to compensate for shift in the center of gravity. In particular, the flight controller 18 will move the aileron 32(*a*) gradually in one direction (i.e., progressively up to provide more lift to the wing 22(*a*)) and will move the aileron 32(*b*) gradually in the other direction (i.e., progressively down to provide more lift to the wing 22(*b*)). Such abnormal aileron behavior is illustrated in FIG. 3 by the deviating average aileron deflection plots (horizontal aileron deflection plots are considered normal). Midlines through the actual measured aileron positions illustrate the average position of each aileron 32.

It should be understood that the flight controller 18 is capable of comparing the aileron position average (see CRA above) for each aileron 32 to a predefined threshold. If the aileron position average of an aileron 32 is less than the predefined threshold, the flight controller 18 considers the aileron 32 to be behaving normally. However, if the aileron position average of an aileron 32 is greater than the predefined threshold, the flight controller 18 considers the aileron 32 to be behaving abnormally.

In some arrangements, the flight controller 18 monitors the position average of each aileron 32 individually, and considers the UAV 10 to experience abnormal aileron behavior when the position average of just one aileron 32 exceeds the predefined threshold. In other arrangements, the flight controller 18 monitors the position average of each aileron 32 individually, and considers the UAV 10 to experience abnormal aileron behavior only when the position average of both ailerons 32 exceed the predefined threshold (i.e., the flight controller 18 confirms abnormal behavior of the other aileron 32 before considering the aileron 32 to be behaving abnormally). There are other suitable ways of processing the aileron evaluation results to determine whether aileron behavior is abnormal (e.g., comparing a sum of the average aileron positions to a predefined aggregate threshold, etc.).

When the flight controller 18 concludes that aileron behavior has become severe enough to warrant action (e.g., based on comparison to one or more thresholds), the flight controller 18 performs a remedial operation. In some arrangements, the flight controller 18 sends a warning message to a GCS 74. In some arrangements, the flight controller 18 performs a fuel assessment operation to project a worse case amount of available fuel 50, and proceeds based on a result of the fuel assessment operation (e.g., automatically lands, automatically flies over a safety area/location and deploys a chute, completes the mission, etc.).

It should be understood that the above-provided example involves the flight controller 18 performing comparisons between the average deflection of each aileron 32 and a predefined threshold to detect abnormal aileron behavior. In other arrangements, the flight controller 18 evaluates rates of change in aileron deflection rather than aileron deflection amounts. Along these lines, the flight controller 18 can consider the UAV 10 to have abnormal aileron behavior when one of the ailerons 32 deflects in particular direction (i.e., up or down) at a rate which exceeds X degrees per hour (e.g., where X is 1.5, 1.75, and so on). In some arrangements, the flight controller 18 considers the UAV 10 to have abnormal aileron behavior when the sum exceeds X degrees per hour for both ailerons 32 (e.g., where X is 3, 3.5, and so on). In a particular use case, each aileron 32 deflects at a rate of approximately 3.4 degrees per hour when one fuel line 42 is blocked, and the flight controller 18 is configured to detect operation close to such a signature rate as an abnormal aileron behavior situation (e.g., over 3 degrees per hour, etc.).

Regardless of whether the flight controller 18 evaluates an average deflection amount or a rate over time, it should be understood that the flight controller 18 performs continual monitoring rather than a one-time check. Such operation enables the flight controller 18 to detect situations other than blocked fuel lines 42 such as icing on one side or one wing of the UAV 10, a mechanical failure of an aileron 32, other weight imbalance conditions that may occur during flight, and so on. Further details will now be provided with reference to FIG. 4.

Figure 4:
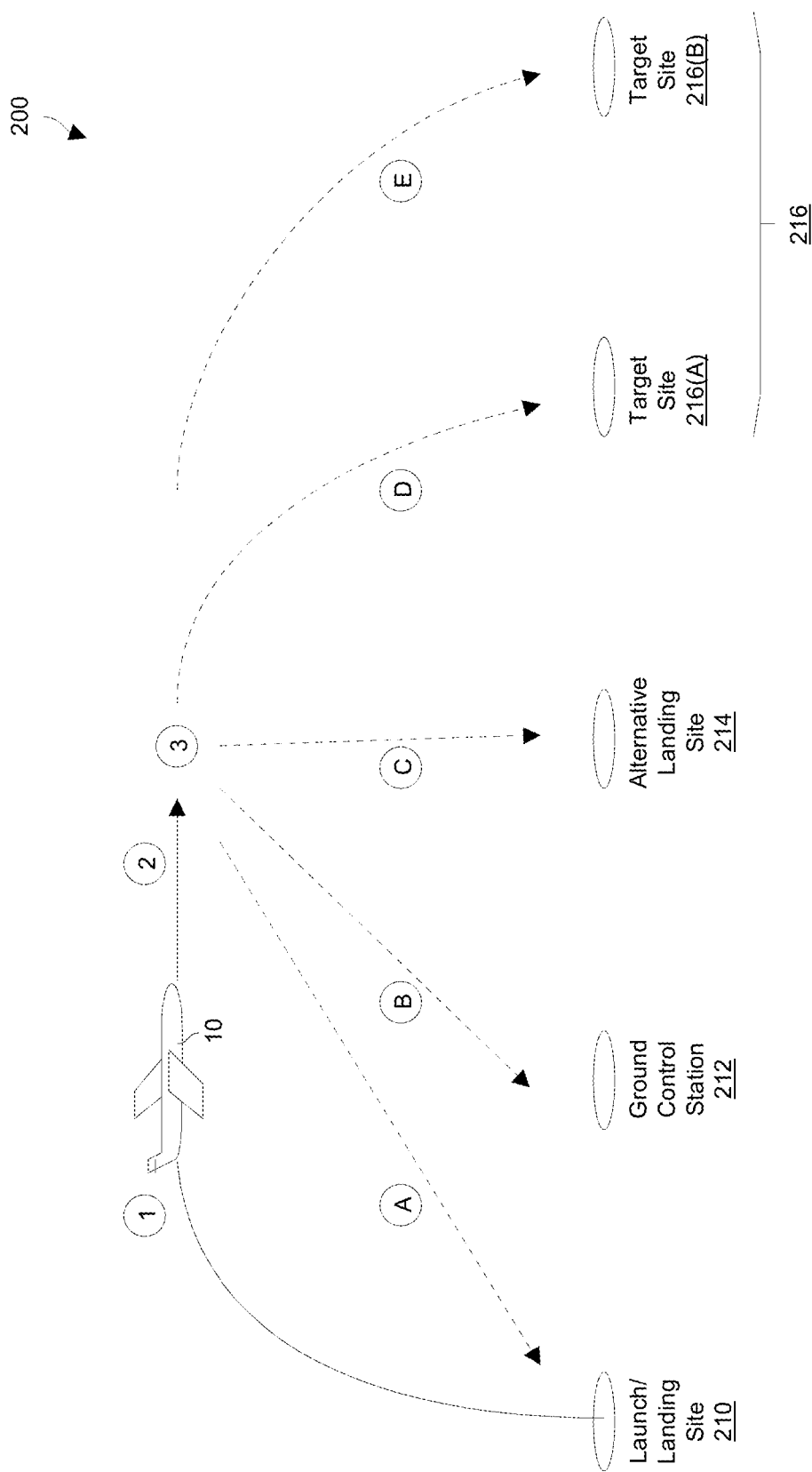
FIG. 4 is a diagram illustrating operation of the UAV of FIG. 1.

FIG. 4 is a diagram illustrating example operations of the UAV 10 within an operating environment 200. The operating environment 200 includes a launch/landing site 210, a ground control station (GCS) 212, an alternative landing site 214, and target sites 216(*a*), 216(*b*) (collectively, target sites 216). It should be understood that other operating environments 200 are suitable for use as well such as ones with multiple GCSs 212, with no alternative landing site 214, with a single target site 216, and so on.

In step 1, the UAV 10 takes off from an initial launch/landing site 200. As part of step 1, the UAV 10 may perform an auto-launch sequence in which the UAV 10 proceeds through a relatively steady and steep climb. Then, the UAV 10 enters straight-line level flight and, during this situation, the UAV 10 identifies and records a neutral (or zero) position for each aileron 32 (also see FIGS. 1 and 2).

In step 2, the UAV 10 evaluates aileron operation over time. In particular, the UAV 10 maintains average aileron positions for each aileron 32 (FIG. 3). Such operation may involve period re-calculation of the average aileron position (e.g., an average amount of deflection or a rate of change over time) for each aileron 32 (Equation (1)) and comparison of the average aileron position to one or more predefined thresholds (e.g., five times a second).

In step 3, the UAV 10 determines that abnormal aileron behavior exists, and performs a remedial operation. Along these lines, the UAV 10 may return to the original launch/landing site 210 (step A), send a warning message to the GCS 212 (step B), fly to the alternative landing site 214 (step C), continue flying to one or more of the target sites 216 (steps D and/or E). Moreover, the UAV 10 may perform a combination of these activities such as send a warning message to the GCS 212 (step B), continue to at least one target site 216 in an attempt to complete all or part of the original mission, and return to one of the landing sites 210, 214. Other combinations/permutations are suitable for use as well. It should be understood that such operations can be performed automatically by the UAV 10 (e.g., when the UAV 10 flies autonomously such as if the UAV 10 loses its communications link with the GCS 212).

In connection with returning to the original landing site 210 (step A), the UAV 10 may perform a calculation to determine whether, under a worse case scenario, the UAV 10 has access to enough fuel 50 to fly back and land safely at the original landing site 210. In particular, due to abnormal aileron behavior, the UAV 10 may assume that one of fuel lines 42 or fuel bladders 40 has malfunctioned, leaving fuel only from the other fuel bladder 40 available for use. Furthermore, this worse case fuel assessment calculation can assume that the UAV 10 has been drawing fuel 50 from only one operable fuel bladder 40 for a period of time. Under this worse case scenario, the UAV 10 may determine that there is not enough fuel 50 available in the only operable fuel bladder 40 to return the original landing site 210 and thus fly to the alternative landing site 214 or perhaps deploy a chute over an easily accessible retrieval location.

In connection with sending a warning message to the GSC 212 (step B), the UAV 10 may occasionally lose its communications link with the GCS 212 and thus be prevented from transmitting information and receiving commands. Until the UAV 10 reestablishes the communications link, the UAV 10 operates autonomously. However, once such communications are reestablished, the UAV 10 may convey its status (e.g., "abnormal aileron behavior") as well as other information (e.g., its chosen new flight plan, additional status, and so on).

In connection with access to the alternative landing site 214, the UAV 10 can perform a worse case fuel assessment operation to determine whether one fuel bladder 40 contains enough fuel to fly the UAV 10 to the alternative landing site 214. Moreover, this calculation can assume that the UAV 10 has been drawing fuel 50 from this one operable fuel bladder 40 for some period of time. If the UAV 10 determines that there is not enough fuel 50 in the one operable fuel bladder 40 to safely land the UAV 10, the UAV 10 can deploy a chute to minimize crash damage.

In connection with the target sites 216, the UAV 10 can perform a worse case fuel assessment operation to determine whether one fuel bladder 40 contains enough fuel to fly the UAV 10 to one or more of the target sites 216. In some situations, the UAV 10 may still have access to enough fuel 50 in the operable fuel bladder 40 to complete the mission fully and safely land the UAV 10. In other situations, the UAV 10 may still have access to enough fuel 50 in the operable fuel bladder 40 to complete at least part of the mission before safely landing at one of the sites 210, 214.

It should be understood that selection of one or more of the remedial operations may involve computations and decisions made outside the UAV 10. For example, electronic circuitry of the GCS 212 may be able to perform the worse case fuel assessment operation independently or collaboratively with the UAV 10 based on known parameters conveyed to the GCS 212 from the UAV 10 during flight, and/or from known parameters and assumptions made when configuring the UAV 10 for the mission. As input to the worse case fuel assessment operation, additional factors can be considered such as weather conditions (e.g., wind direction/speed, air pressure, precipitation, etc.), elapsed flight time, and so on.

It should be further understood that certain expected UAV operations may affect the series of aileron deflection evaluations. For example, it is possible for the UAV 10 to release more munitions from one wing 22 than the other wing 22. As a result, the UAV 10 may need to purposefully modify its aileron behavior to compensate, i.e., such modified aileron behavior due to the purposeful weight imbalance is considered normal. Further details will now be provided with reference to FIG. 5.

Figure 5:
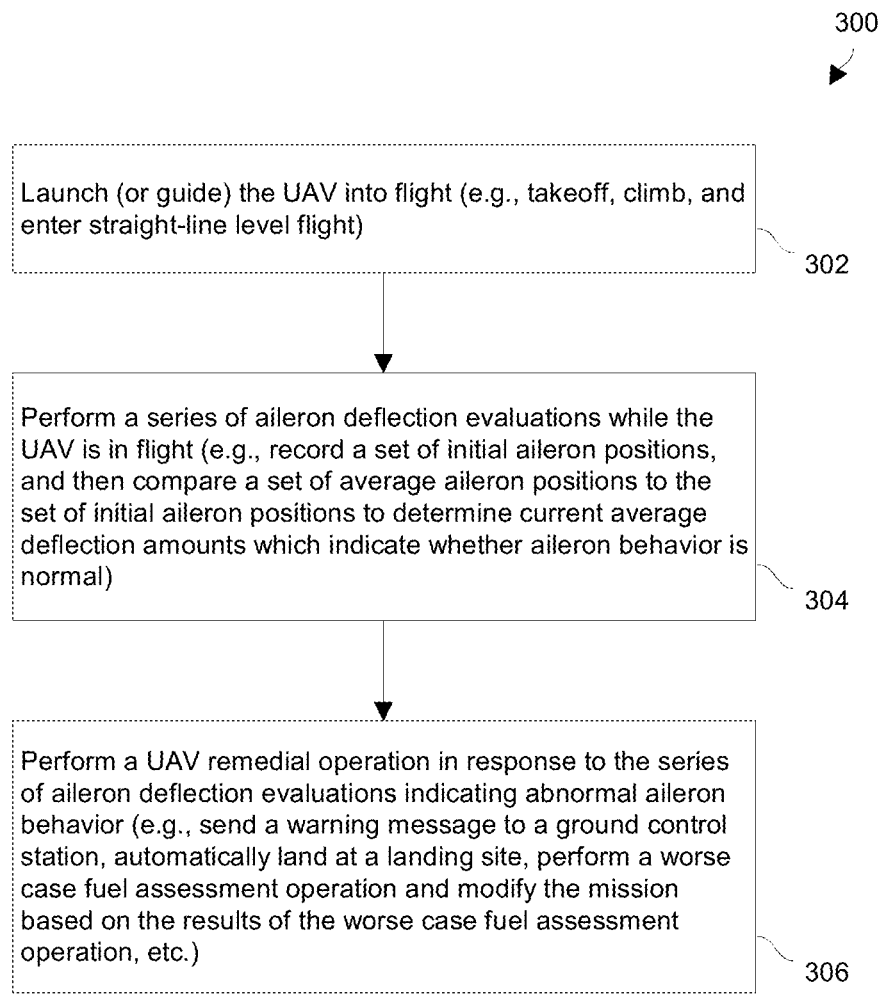
FIG. 5 is a flowchart of a procedure which is performed by the UAV of FIG. 1.

FIG. 5 is a flowchart of a procedure 300 for operating the UAV 10. At 302, the UAV 10 launches into flight. In some arrangements, the UAV 10 begins by performing an auto-launch sequence which includes takeoff, a period of steep and steady flight to gain altitude, and a period of straight-line level flight.

At 304, the UAV 10 performs a series of aileron deflection evaluations while in flight. In particular, the UAV 10 takes initial aileron position readings while continuing in straight-line level flight and then uses the initial aileron position readings as neutral (or zero) positions. The UAV 10 then monitors average aileron position as measured from the neutral positions. While the average aileron position for each aileron 32 remains below a predefined threshold, the UAV 10 considers the ailerons 32 as behaving normally. However, an average aileron position for an aileron 32 exceeds the predefined threshold, the UAV 10 considers the ailerons 32 as behaving abnormally.

At 306, the UAV 10 determines that the ailerons 32 are behaving abnormally, and performs a remedial operation. In some arrangements, the remedial operation includes sending a warning message to a GCS. In some arrangements, the remedial operation includes aborting the mission and safely landing the UAV 10 or deploying a chute. In some arrangements, the remedial operation includes performing a worse case fuel assessment operation to confirm that there is enough fuel to at least part of the mission, and continuing flight to a target to perform one or more parts of the mission, and so on.

As described above, improved techniques are directed to evaluating aileron deflection while a UAV 10 is in flight. Such operation enables detection of unexpected or abnormal aileron behavior. Along these lines, a flight controller 18 of the UAV 10 can monitor aileron metrics such as average aileron position to determine whether one aileron 32 begins to progressively move up while the other aileron 32 begins to progressively move down over time. For example, a blocked fuel bladder 40 or fuel line 42 can result in fuel 50 consumed from only one side or wing 22 of the UAV 10 while the other side or wing 22 remains relatively full. Accordingly, the ailerons 32 deflect differently to adjust to shifting of the UAV's center of gravity over time. Eventually, if change in the UAV's center of gravity becomes too severe (e.g., detected by exceeding a predefined threshold), the flight controller 18 can perform a remedial operation such as send a warning message to a GCS 212, land at a target site 210, 214, deploy a chute, and so on. Moreover, such operation not only protects the UAV 10 against failure of a fuel bladder or connection, such operation can safeguard against other events such as a mechanical aileron failure, icing on one side or on one wing of the UAV 10, and so on.

While various embodiments of the present disclosure have been particularly shown and described, it will be understood by those skilled in the art that various changes in form and details may be made therein without departing from the spirit and scope of the present disclosure as defined by the appended claims.

For example, it should be understood that with straight-line level flight built in as part of the auto-launching sequence for the UAV 10, no modifications need to be made to any flight plan in order to obtain suitable neutral position measurements of the ailerons 32. Rather, such neutral position measurements are easily obtained while the UAV 10 executes an original flight plan.

Additionally, it should be understood that the improvements do not require the addition of any new sensors. Rather, the data that is available in legacy UAV hardware (e.g., actuator readings, control signals to actuators, etc.) is suitable for use as aileron positioning data from which the average aileron positions can be determined over time.

Furthermore, it should be understood that Equation (1) above is suitable for computing a running average for an aileron 32 either over an extended period of time or over a fixed time window. Over an extended period of time, the value of NOR (number of readings) continues to increase. During a fixed time window, the value of NOR increases until it reaches a particular value (e.g., representing one hour, two hours, four hours, etc.) and then remains constant thus defining a fixed time window. Both techniques are suitable for use by the UAV 10 in determining abnormal behavior.

Moreover, the term UAV was used above to describe various apparatus which are suitable for use by the disclosed improvements. It should be understood that the improved techniques are applicable to a variety of vehicles including unmanned aircraft (UA) generally, organic air vehicles (OAVs), micro air vehicles (MAVs), unmanned ground vehicles (UGVs), unmanned water vehicles (UWVs), unmanned combat air vehicles (UCAVs), and so on.

Additionally, it should be understood that the above-described techniques are suitable for use in manned aviation. Along these lines, such techniques are capable of being used while a manned aircraft is placed in an automated or autonomous mode (e.g., in "automatic pilot assisted flight") to evaluate aileron operation.

Furthermore, it should be understood that the above-described techniques can be applied to control surfaces other than ailerons. Such other control surfaces include elevators, elerudders, tabs, spoilers, spoilerons, flaps, slats, airbrakes, trims, and other operable control elements. Accordingly, such techniques are capable of detecting abnormal conditions such as shifts in center of gravity (e.g., due to a blocked fuel bladder when fuel bladders are located in the wings), control surface malfunction, and so on.

Additionally, it should be understood that such techniques are capable of detecting a blocked fuel bladder in a wing (or other center of gravity shifts) even in situations which use a combination of wing-disposed fuel bladders and one or more center-line fuel pods. Such modifications and enhancements are intended to belong to various embodiments of the disclosure.

What is claimed is:

1. A method of operating an unmanned aerial vehicle (UAV), the method comprising:
    launching, by processing circuitry, the UAV into flight;
    performing, by the processing circuitry, a series of control surface deflection evaluations while the UAV is in flight; and
    performing, by the processing circuitry, a UAV remedial operation in response to the series of control surface deflection evaluations indicating abnormal control surface deflection behavior;
wherein performing the series of control surface deflection evaluations includes:
    while a set of ailerons of the UAV operate normally to compensate for a shift in the center of gravity of the UAV, identifying an UAV weight imbalance situation based on deflection by the set of ailerons; and
wherein identifying the UAV weight imbalance situation includes:
    while the set of ailerons of the UAV operate normally to compensate for the shift in the center of gravity of the UAV, detecting (i) gradually increasing deflection of a first aileron in a first deflection direction over time and (ii) gradually increasing deflection of a second aileron in a second deflection direction over time, the first deflection direction being opposite the second deflection direction, to identify occurrence of a weight imbalance condition.

2. The method as in claim 1 wherein detecting the gradually increasing deflections of the first and second ailerons includes:
    identifying a set of initial aileron positions,
    comparing a set of average aileron positions to the set of initial aileron positions, and
    providing a series of evaluation results indicating whether the UAV has encountered abnormal aileron deflection behavior.

3. The method as in claim 2 wherein identifying the set of initial aileron positions includes:
    identifying, as one of the initial aileron positions, a first neutral position for a first aileron of the UAV, and
    identifying, as another of the initial aileron positions, a second neutral position for a second aileron of the UAV.

4. The method as in claim 3 wherein comparing the set of average aileron positions to the set of initial aileron positions includes:
    maintaining a first aileron position average for the first aileron, the first aileron position average representing an average amount of angular deflection of the first aileron from the first neutral position, and
    maintaining a second aileron position average for the second aileron, the second aileron position average representing an average amount of angular deflection of the second aileron from the second neutral position.

5. The method as in claim 4 wherein providing the series of evaluation results includes:
    outputting normal evaluation results indicating normal aileron deflection behavior when each aileron position average remains below a predefined aileron position average threshold, and
    outputting abnormal evaluation results indicating abnormal aileron deflection behavior when at least one aileron position average exceeds the predefined aileron position average threshold.

6. The method as in claim 4 wherein providing the series of evaluation results includes:
    outputting normal evaluation results indicating normal aileron deflection behavior when a sum of the aileron position averages remains below a predefined aileron position average threshold, and
    outputting abnormal evaluation results indicating abnormal aileron deflection behavior when the sum of the aileron position averages exceeds the predefined aileron position average threshold.

7. The method as in claim 3 wherein launching the UAV into flight includes:
    flying the UAV in a straight-line level pattern during an auto-launch time period following takeoff.

8. The method as in claim 7 wherein identifying the set of initial aileron positions includes:
    recording, as a first neutral position for the first aileron, a current position of the first aileron while the UAV flies in the straight-line level pattern during the auto-launch time period, and
    recording, as a second neutral position for the second aileron, a current position of the second aileron while the UAV flies in the straight-line level pattern during the auto-launch time period.

9. The method as in claim 3 wherein performing the UAV remedial operation includes:
    sending a warning message to a ground control station indicating that the UAV has encountered a weight imbalance condition.

10. The method as in claim 3 wherein performing the UAV remedial operation includes:
    performing a fuel assessment operation which provides a result indicating whether a single operable fuel bladder of the UAV has enough fuel for the UAV to land at the designated target location.

11. The method as in claim 10 wherein performing the UAV remedial operation further includes:
    flying the UAV to the designated target location and landing the UAV at the designated target location when the result of the fuel assessment operation indicates that the single operable fuel bladder of the UAV has enough fuel for the UAV to land at the designated target location, and
    deploying a chute of the UAV when the result of the fuel assessment operation indicates that the single operable fuel bladder of the UAV does not have enough fuel for the UAV to land at the designated target location.

12. The method as in claim 3 wherein performing the UAV remedial operation includes:
   performing a fuel assessment operation which provides a result indicating whether a single operable fuel bladder of the UAV has enough fuel for the UAV to complete an initially assigned mission.

13. The method as in claim 12 wherein performing the UAV remedial operation further includes:
   completing the initially assigned mission when the result of the fuel assessment operation indicates that the single operable fuel bladder of the UAV has enough fuel for the UAV to complete the initially assigned mission, and
   aborting the initially assigned mission when the result of the fuel assessment operation indicates that the single operable fuel bladder of the UAV does not have enough fuel for the UAV to complete the initially assigned mission.

14. The method as in claim 2 wherein performing the series of control surface deflection evaluations includes:
   providing compensation input to the series of control surface deflection evaluations in response to release of ammunition from the UAV.

15. The method as in claim 1 wherein detecting the gradually increasing deflections of the first and second ailerons includes:
   tracking an average position of the first aileron and comparing a current position of the first aileron to the average position of the first aileron, and
   tracking an average position of the second aileron and comparing a current position of the second aileron to the average position of the second aileron.

16. The method as in claim 1 wherein detecting the gradually increasing deflections of the first and second ailerons includes:
   tracking a first deflection rate of change by the first aileron exceeds a first deflection rate threshold, and
   tracking a second deflection rate of change by the second aileron exceeds a second deflection rate threshold.

17. An unmanned aerial vehicle, comprising:
   an unmanned aerial vehicle (UAV) frame;
   a set of ailerons supported by the UAV frame; and
   a controller supported by the UAV frame and in operable communication with the ailerons, the controller being constructed and arranged to:
      while the UAV is in flight, perform a series of aileron deflection evaluations, and
      perform a UAV remedial operation in response to the series of aileron deflection evaluations indicating abnormal aileron behavior;
   wherein the controller, when performing the series of aileron deflection evaluations includes:
      while the set of ailerons of the UAV operate normally to compensate for a shift in the center of gravity of the UAV, identifying an UAV weight imbalance situation based on deflection by the set of ailerons; and
   wherein identifying the UAV weight imbalance situation includes:
      while the set of ailerons of the UAV operate normally to compensate for the shift in the center of gravity of the UAV, detecting (i) gradually increasing deflection of a first aileron in a first deflection direction over time and (ii) gradually increasing deflection of a second aileron in a second deflection direction over time, the first deflection direction being opposite the second deflection direction, to identify occurrence of a weight imbalance condition.

18. The unmanned aerial vehicle as in claim 17 wherein the controller, when detecting the gradually increasing deflections of the first and second ailerons, is constructed and arranged to:
   identify a set of initial aileron positions,
   compare a set of average aileron positions to the set of initial aileron positions, and
   provide a series of evaluation results indicating whether the UAV has encountered abnormal aileron deflection behavior.

19. The unmanned aerial vehicle as in claim 18 wherein the controller, when identifying the set of initial aileron positions, is constructed and arranged to:
   identify, as one of the initial aileron positions, a first neutral position for a first aileron of the UAV, and
   identify, as another of the initial aileron positions, a second neutral position for a second aileron of the UAV.

20. The unmanned aerial vehicle as in claim 19 wherein the controller, when comparing the set of average aileron positions to the set of initial aileron positions, is constructed and arranged to:
   maintain a first aileron position average for the first aileron, the first aileron position average representing an average amount of angular deflection of the first aileron from the first neutral position, and
   maintain a second aileron position average for the second aileron, the second aileron position average representing an average amount of angular deflection of the second aileron from the second neutral position.

21. The unmanned aerial vehicle in claim 20 wherein the controller, when launching the UAV into flight, is constructed and arranged to fly the UAV in a straight-line level pattern during an auto-launch time period following takeoff; and
   wherein the controller, when identifying the set of initial aileron positions, is constructed and arranged to (i) record, as a first neutral position for the first aileron, a current position of the first aileron while the UAV flies in the straight-line level pattern during the auto-launch time period, and (ii) record, as a second neutral position for the second aileron, a current position of the second aileron while the UAV flies in the straight-line level pattern during the auto-launch time period.

22. A computer program product having a non-transitory computer readable medium which stores a set of instructions to operate an unmanned aerial vehicle (UAV), the set of instructions, when carried out by computerized circuitry, causing the computerized circuitry to perform a method of:
   launching the UAV into flight;
   while the UAV is in flight, performing a series of aileron deflection evaluations; and
   performing a UAV remedial operation in response to the series of aileron deflection evaluations indicating abnormal aileron behavior;
wherein performing the series of aileron deflection evaluations includes:
   while a set of ailerons of the UAV operate normally to compensate for a shift in the center of gravity of the UAV, identifying an UAV weight imbalance situation based on deflection by the set of ailerons; and
wherein identifying the UAV weight imbalance situation includes:
   while the set of ailerons of the UAV operate normally to compensate for the shift in the center of gravity of the UAV, detecting (i) gradually increasing deflection of a first aileron in a first deflection direction over time and (ii) gradually increasing deflection of a second aileron in a second deflection direction over time, the first deflection direction being opposite the second deflection direction, to identify occurrence of a weight imbalance condition.

23. The computer program product as in claim 22 wherein detecting the gradually increasing deflections of the first and second ailerons includes:
   tracking an average position of the first aileron and comparing a current position of the first aileron to the average position of the first aileron, and
   tracking an average position of the second aileron and comparing a current position of the second aileron to the average position of the second aileron.

24. The computer program product as in claim 22 wherein detecting the gradually increasing deflections of the first and second ailerons includes:
   tracking a first deflection rate of change by the first aileron exceeds a first deflection rate threshold, and
   tracking a second deflection rate of change by the second aileron exceeds a second deflection rate threshold.

* * * * *